United States Patent
Zhou et al.

(10) Patent No.: US 10,764,930 B2
(45) Date of Patent: Sep. 1, 2020

(54) MESSAGE TRANSMISSION THROUGH A RANDOM ACCESS SCHEME

(71) Applicant: Huawei Technologies Co., Ltd., Shenzhen (CN)

(72) Inventors: Chan Zhou, Munich (DE); Liang Hu, Shenzhen (CN); Malte Schellmann, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/233,724

(22) Filed: Dec. 27, 2018

(65) Prior Publication Data
US 2019/0132887 A1 May 2, 2019

Related U.S. Application Data

(63) Continuation of application No. PCT/EP2016/065103, filed on Jun. 29, 2016.

(51) Int. Cl.
*H04W 74/08* (2009.01)
*H04L 27/26* (2006.01)
(Continued)

(52) U.S. Cl.
CPC ..... *H04W 74/0833* (2013.01); *H04L 27/2607* (2013.01); *H04W 74/02* (2013.01); *H04W 88/02* (2013.01); *H04L 5/0007* (2013.01)

(58) Field of Classification Search
None
See application file for complete search history.

(56) References Cited

U.S. PATENT DOCUMENTS

| | | | |
|---|---|---|---|
| 6,094,421 A | 7/2000 | Scott | |
| 6,597,675 B1 * | 7/2003 | Esmailzadeh | H04J 13/107 370/335 |

(Continued)

FOREIGN PATENT DOCUMENTS

| | | |
|---|---|---|
| CN | 103782527 A | 5/2014 |
| CN | 104869652 A | 8/2015 |

(Continued)

OTHER PUBLICATIONS

Karagiannis et al.,"Vehicular Networking: A Survey and Tutorial on Requirements, Architectures, Challenges, Standards and Solutions," IEEE Communications Surveys & Tutorials, vol. 13, No. 4, Fourth Quarter, pp. 584-616, Institute of Electrical and Electronics Engineers, New York, New York (2011).

(Continued)

*Primary Examiner* — Ayanah S George
(74) *Attorney, Agent, or Firm* — Leydig, Voit & Mayer, Ltd.

(57) ABSTRACT

A random access (RA) scheme exhibiting a non-isometric frame duration and a low latency. The RA and data messages have a duration with a different time unit and the time slot of the RA message is much shorter than the duration of one data frame. A specific signature, which is designed to be robust against the collisions, is transmitted during the RA request, the signature being either a unique sequence or a compressed signature. The user equipment device transmits the data message immediately after receiving its resource through a frame structure showing a time misalignment between adjacent data frames located in different or identical frequency sub-bands. A frequency guard band is inserted between its resource and an adjacent resource assigned to another user equipment device, the frequency guard band (Continued)

having an adaptive size according to the level of time misalignment and its impact on the distortion.

11 Claims, 12 Drawing Sheets

(51) Int. Cl.
*H04W 74/02* (2009.01)
*H04W 88/02* (2009.01)
*H04L 5/00* (2006.01)

(56) References Cited

U.S. PATENT DOCUMENTS

| | | | |
|---|---|---|---|
| 8,457,039 | B2 | 6/2013 | Muharemovic et al. |
| 2014/0169298 | A1 | 6/2014 | Li et al. |
| 2014/0274082 | A1* | 9/2014 | Huang .................. H04W 28/20 455/450 |
| 2016/0150532 | A1 | 5/2016 | Bhushan et al. |
| 2016/0374048 | A1* | 12/2016 | Griot ....................... H04W 4/70 |

FOREIGN PATENT DOCUMENTS

| | | |
|---|---|---|
| EP | 2816858 A1 | 12/2014 |
| WO | 2008097142 A1 | 8/2008 |
| WO | 2015129985 A1 | 9/2015 |

OTHER PUBLICATIONS

"Network Migration for Utilities—Teleprotection over Packet," RAD Data Communications, Catalog No. 802491 Version 5, Mahwah, NJ (2011).

"3rd Generation Partnership Project; Technical Specification Group Radio Access Network; Evolved Universal Terrestrial Radio Access (E-UTRA); Physical layer procedures(Release 11)," 3GPP TS 36.213 V11.0.0, pp. 1-143, 3rd Generation Partnership Project, Valbonne, France (Sep. 2012).

"3rd Generation Partnership Project; Technical Specification Group Radio Access Network; Evolved Universal Terrestrial Radio Access (E-UTRA); Radio Resource Control (RRC);Protocol specification(Release 10)," 3GPP TS 36.331 V10.1.0, pp. 1-290, 3rd Generation Partnership Project, Valbonne, France (Mar. 2011).

IEEE Standard for Information technology—Telecommunications and information exchange between systems, Local and metropolitan area networks—Specific requirements, Part 11: Wireless LAN Medium Access Control (MAC) and Physical Layer (PHY) Specifications, IEEE Std 802.11™—2012, pp. 1-2793, Institute of Electrical and Electronics Engineers, New York, New York (Mar. 29, 2012).

Sjoberg-Bilstrup et al., "Scalability Issues of the MAC Methods STDMA and CSMA of IEEE 802.11p When Used in VANETs," Institute of Electrical and Electronics Engineers, New York, New York (2010).

"3rd Generation Partnership Project; Technical Specification Group Radio Access Network; Feasibility study for evolved Universal Terrestrial Radio Access (UTRA) and Universal Terrestrial Radio Access Network (UTRAN) (Release 10)," 3GPP TR 25.912 V10.0.0, pp. 1-64, 3rd Generation Partnership Project, Valbonne, France (Mar. 2011).

Popovski et al., "Proposed solutions for new radio access," ICT-317669-METIS/D2.4, Deliverable D2.4, pp. 1-190, METIS, Seventh Framework Programme (Feb. 2015).

Bockelmann et al., "Compressive sensing based multi-user detection for machine-to-machine communication," Transactions on Emerging Telecommunications Technologies, pp. 389-400, Wiley Online Library (Apr. 18, 2013).

Schepker et al., "Sparse Multi-User Detection for CDMA Transmission using Greedy Algorithms," 2011 8th International Symposium on Wireless Communication Systems, Aachen, pp. 291-295, Institute of Electrical and Electronics Engineers, New York, New York (2010).

Chen et al., "Atomic Decomposition by Basis Pursuit," Siam J. Sci. Comput. vol. 20, No. 1, pp. 33-61, Society for Industrial and Applied Mathematics (1998).

Tropp et al., "Signal Recovery From Random Measurements Via Orthogonal Matching Pursuit," IEEE Transactions on Information Theory, vol. 53, No. 12, pp. 4655-4666, Institute of Electrical and Electronics Engineers, New York, New York (Dec. 2007).

Blumensath et al., "Iterative hard thresholding for compressed sensing," Applied and Computational Harmonic Analysis, pp. 265-274, Elsevier Inc. (2009).

Farhang-Boroujeny et al., "OFDM Versus Filter Bank Multicarrier," IEEE Signal Processing Magazine, vol. 28, No. 3, pp. 92-112, Institute of Electrical and Electronics Engineers, New York, New York (May 2011).

Zhao et al., "Pulse Shaped OFDM for Asynchronous Uplink Access," Asilomar Conference on Signals, Systems and Computers, Monterey, USA, Institute of Electrical and Electronics Engineers, New York, New York (2015).

Wild et al., "5G Air Interface Design based on Universal Filtered (UF-)OFDM," Proceedings of the 19th International Conference on Digital Signal Processing, pp. 699-704, Institute of Electrical and Electronics Engineers, New York, New York (Aug. 20-23, 2014).

* cited by examiner

MESSAGE TRANSMISSION THROUGH A RANDOM ACCESS SCHEME

CROSS-REFERENCE TO RELATED APPLICATIONS

This application is a continuation of International Application No. PCT/EP2016/065103, filed on Jun. 29, 2016, the disclosure of which is hereby incorporated by reference in its entirety.

TECHNICAL FIELD

Embodiments of the invention relate to the field of wireless communications, and more particularly to a message transmission through a random access scheme.

BACKGROUND

Emerging communication services, such as traffic safety through vehicular networking, real-time remote monitoring and control of critical infrastructure, and industrial autonomous control raise new challenges to the mobile and wireless radio networks. One of the most critical requirements is the support for low latency (i.e., less than a few milliseconds) with high reliability (i.e., failure rate close to zero).

SUMMARY

An object of embodiments of the present invention to provide a collision-free and low latency random access scheme capable of supporting a large number of user equipment devices.

The object is achieved by the features of the independent claims. Further embodiments of the invention are apparent from the dependent claims, the description and the figures.

According to a first aspect, an embodiment relates to a user equipment device for transmitting a data message through a random access procedure in a wireless communication system, wherein the user equipment device is adapted to transmit a random access request and the data message, the random access request and the data message having a respective duration with a different time unit and the time unit of the random access request being shorter than the time unit of the data message.

Thereby, the frame duration can be rendered non-isometric in order to have a reduced latency resulting from the time delay caused by the random access request time slot of reduced duration. Thus, the data transmission following the random access step can start more quickly.

According to a first implementation of the user equipment device according to the first aspect, the user equipment device is adapted to receive a random access response from a base station in response to the random access request being transmitted towards the base station, the time unit of the random access response being different from the time unit of the data message.

Thereby, the latency resulting from the time delay caused by the random access message (i.e., the random access request and the random access response) time slot can be further reduced so that the data transmission following the random access message transmission can still start quickly.

According to a second implementation of the user equipment device according to the first aspect, the user equipment device is adapted to have a unique signature in the form of a short sequence, the signature being transmitted through the transmission of the random access request.

Thereby, a large number of user equipment devices can be supported and a reliable random access scheme can be obtained. Indeed, each user equipment device can be individually identified, through its unique signature, by the receiving device (i.e., a base station or a user equipment device when in a device-to-device communication), which can then distinguish the requests from different user equipment devices and assign different resources to each user equipment device. Thus, it is not possible to assign an identical resource for the data transmission to a plurality of user equipment devices so that any collision during the data transmission can be avoided: such a contention-free, i.e., collision-free, signaling scheme allows to obtain a reliable random access scheme. Hence, any data retransmission due to collision, which leads to an additional delay, can be avoided and the latency in the random access procedure can be further reduced.

According to a third implementation of the user equipment device according to the first aspect, the user equipment device is adapted to have a compressed signature by multiplying a compressive sensing matrix and a binary sequence corresponding to a unique identity of the user equipment device, the compressed signature being of very small length compared to the length of the binary sequence and transmitted through the transmission of the random access request.

Thereby, less bandwidth with respect to the case of the non-compressed unique signature needs to be reserved for the transmission of the random access request, a larger number of user equipment devices with respect to the case of the non-compressed unique signature can be supported and a reliable random access scheme can be obtained. Hence, any data retransmission necessary after a collision, which leads to an additional delay, can be avoided and the latency in the random access procedure can be further reduced. Indeed, each user equipment device can be individually identified, through its unique identity and compressed signature, by the receiving device (i.e., a base station or a user equipment device when in a device-to-device communication), which can collect a linear combination of the respective transmitted compressed signatures, distinguish the requests from different user equipment devices and assign a different resource for the data transmission to each user equipment device in order to obtain a reliable random access scheme through a contention-free, i.e., collision-free, signaling scheme.

According to a fourth implementation of the user equipment device according to the first aspect, the random access request is transmitted towards another user equipment device over a device-to-device communication and the user equipment device is adapted to have a predetermined order number, which is known in advance by each user equipment device and respectively attributed to each user equipment device, and adapted to acquire, from a predetermined resource pool assigned to a group of user equipment devices in the device-to-device communication, a resource for its transmission towards the other user equipment device, the acquisition of the resource being carried out in order of priority according to the predetermined order number if a plurality of user equipment devices desires to transmit data messages towards other user equipment devices at a same time over the device-to-device communication.

Thus, the time delay caused by the random access channel time slot can be reduced by skipping the step of providing the random access response, and a reliable random access scheme can be obtained. Since each user equipment device has its own order number or rank, a collision during the data transmission can be avoided as it is not possible to assign an identical resource for the data transmission to a plurality of user equipment devices. Such a contention-free, i.e., collision-free, signaling scheme allows to obtain a reliable random access scheme. The reduction in the time delay and in the low probability of collision can further reduce the latency in the random access procedure.

According to a fifth implementation of the user equipment device according to the first or fourth implementation of the first aspect, the user equipment device is adapted to transmit the data message through a data frame structure upon assignment of its resource, wherein a time misalignment occurs between two data frames located in adjacent frequency sub-bands, the two data frames being separately and respectively transmitted from the user equipment device and another user equipment device.

Thereby, the data frame structure does not have to be a lattice structure, in which the data signals (or more precisely, the data frames) are time-aligned with a transmission time interval grid in a fully synchronous transmission. Thus, the user equipment device can, through an "irregular" structure showing a time misalignment between the adjacent data frames located in different or identical frequency sub-bands, transmit in a non-synchronous or quasi-asynchronous manner as soon as it has identified its frequency resource.

According to a sixth implementation of the user equipment device according to the fifth implementation of the first aspect, an adaptive frequency guard band is inserted between its resource and an adjacent resource assigned to the other user equipment device, the frequency guard band being adapted to have an adaptive size based on a level of the time misalignment between two data frames located in adjacent frequency sub-bands, on a decay power of a pulse shape used for the data transmission and on a desired power suppression level to be attained by the respective pulse shape used for the transmission of each one of the two data frames.

Thereby, the interference caused by the time-misalignment can be maintained at a reduced level, the size (or more precisely, the width) of the frequency guard band varying according to the time-misalignment, and the size of the frequency guard band can be optimally adjusted to save frequency resources by considering the impact of the time misalignment and the transmit signal (in particular, the pulse shape used for the transmission) used by each of the two user equipment devices on the distortion of the signal used by the user equipment device for its data transmission.

According to a seventh implementation of the user equipment device according to the sixth implementation of the first aspect, the user equipment device is adapted to determine the size of the frequency guard band based on an information received from the base station about the time misalignment, the desired power suppression levels to be attained by the respective pulse shapes used for the transmission of the two data frames located in adjacent frequency sub-bands and the pulse shape used for the transmission of the data frame located in the adjacent frequency sub-band.

Thereby, the base station can use the random access response to transmit the information required for the determination of the size of the frequency guard band towards the user equipment device, and the user equipment device can locally determine the size of the frequency guard band: an alternative to the determination of the guard band size by the base station can thus be proposed.

According to an eighth implementation of the user equipment device according to the sixth implementation of the first aspect when in a device-to-device communication with another user equipment device, the user equipment device is adapted to determine the size of the frequency guard band by determining the time misalignment based on a detection of the received data frame transmitted from the other user equipment device and located in the adjacent frequency sub-band, and by respecting the desired power suppression levels to be attained by the respective pulse shapes and the pulse shape used for the transmission of the data frame located in the adjacent frequency sub-band.

Thereby, it is possible for each user equipment device in a device-to-device communication to determine the size of the frequency guard band in an alternative way with respect to a communication with a base station. As the step of random access acknowledgement and resource assignment is skipped in the device-to-device communication, the information about the desired power suppression levels to be attained by the respective pulse shapes and the pulse shape used for the transmission of the data frame located in the adjacent frequency sub-band shall be pre-defined and known beforehand by each user equipment device or alternatively broadcast by any one of the user equipment devices.

The above object is also solved in accordance with a second aspect. According to the second aspect, an embodiment relates to a base station adapted to exchange information with at least one user equipment device as claimed in the first aspect or any one of the implementations of the first aspect, and receive the data message from the at least one user equipment device.

According a first implementation of the base station according to the second aspect, the base station is adapted to determine the size of the frequency guard band based on the time misalignment, the desired power suppression levels to be attained by the respective pulse shapes used for the transmission of the two data frames located in adjacent frequency sub-bands and the respective pulse shapes used for the transmission of the respective two data frames, and inform the user equipment device about the determined size of the frequency guard band.

Thereby, the determination of the size of the frequency guard band can be entirely carried out by the base station.

The above object is also solved in accordance with a third aspect.

According to the third aspect, an embodiment relates to a system for transmitting a data message through a random access procedure in a wireless communication system, the system comprising at least one user equipment device as claimed in the first aspect or any one of the implementations of the first aspect, and at least one base station as claimed in the second aspect or the first implementation of the second aspect.

The above object is also solved in accordance with a fourth aspect.

According to the fourth aspect, an embodiment relates to a method for transmitting a data message through a random access procedure in a wireless communication system, the method comprising the steps of transmitting a random access message, and transmitting the data message, wherein the random access message and the data message have a respective duration with a different time unit, and wherein the time unit of the random access message is shorter than the time unit of the data message.

The above object is also solved in accordance with a fifth aspect.

According to the fifth aspect, an embodiment relates to a method for determining a size of a frequency guard band in a wireless transmission system, the method comprising the steps of checking whether a size of a time misalignment between a first data frame located in a first frequency sub-band and a second data frame located in a second frequency sub-band adjacent to the first frequency sub-band is larger than a size of a cyclic prefix, and applying, when the size of the time misalignment is larger than the size of the cyclic prefix, the following steps of determining a first size of the frequency guard band based on a power spectral density of a first pulse shape used for a transmission of the first data frame located in the first frequency sub-band, determining a second size of the frequency guard band based on a power spectral density of a second pulse shape used for a transmission of the second data frame located in the second frequency sub-band adjacent to the first frequency sub-band, and selecting the size of the frequency guard band as being the highest value amongst the first and second sizes.

Thereby, the frequency guard band can have an adaptive size or width according to the level of time misalignment, the pulse shapes used by the user equipments and the impact of the time misalignment on the distortion of the transmit signals, which allows to minimize the signal power leakage in the frequency domain.

The above object is also solved in accordance with a sixth aspect.

According to the sixth aspect, an embodiment relates to a computer program comprising program code for performing the method according to any one of the fourth and fifth aspects when executed on a computer.

Thereby, the method can be performed in an automatic and repeatable manner.

The computer program can be performed by any one of the above apparatuses or devices. The apparatuses or devices can be programmably arranged to perform the computer program. Embodiments of the invention can be implemented in hardware, software or in any combination thereof.

It shall further be understood that a preferred embodiment of the invention can also be any combination of the dependent claims or above embodiments with the respective independent claim.

These and other aspects of the invention will be apparent and elucidated with reference to the embodiments described hereinafter.

BRIEF DESCRIPTION OF THE DRAWINGS

In the following detailed portion of the present disclosure, embodiments will be explained in more detail with reference to the exemplary embodiments shown in the drawings, in which.

Identical reference signs are used for identical or at least functionally equivalent features.

DETAILED DESCRIPTION OF EMBODIMENTS OF THE INVENTION

To meet the requirements for low latency with high reliability, two scenarios can exist in the current communication networks (e.g., the long term evolution (LTE) networks): keeping the user in an always connected mode or applying a random access (RA) request/acknowledgement procedure.

Figure 1:
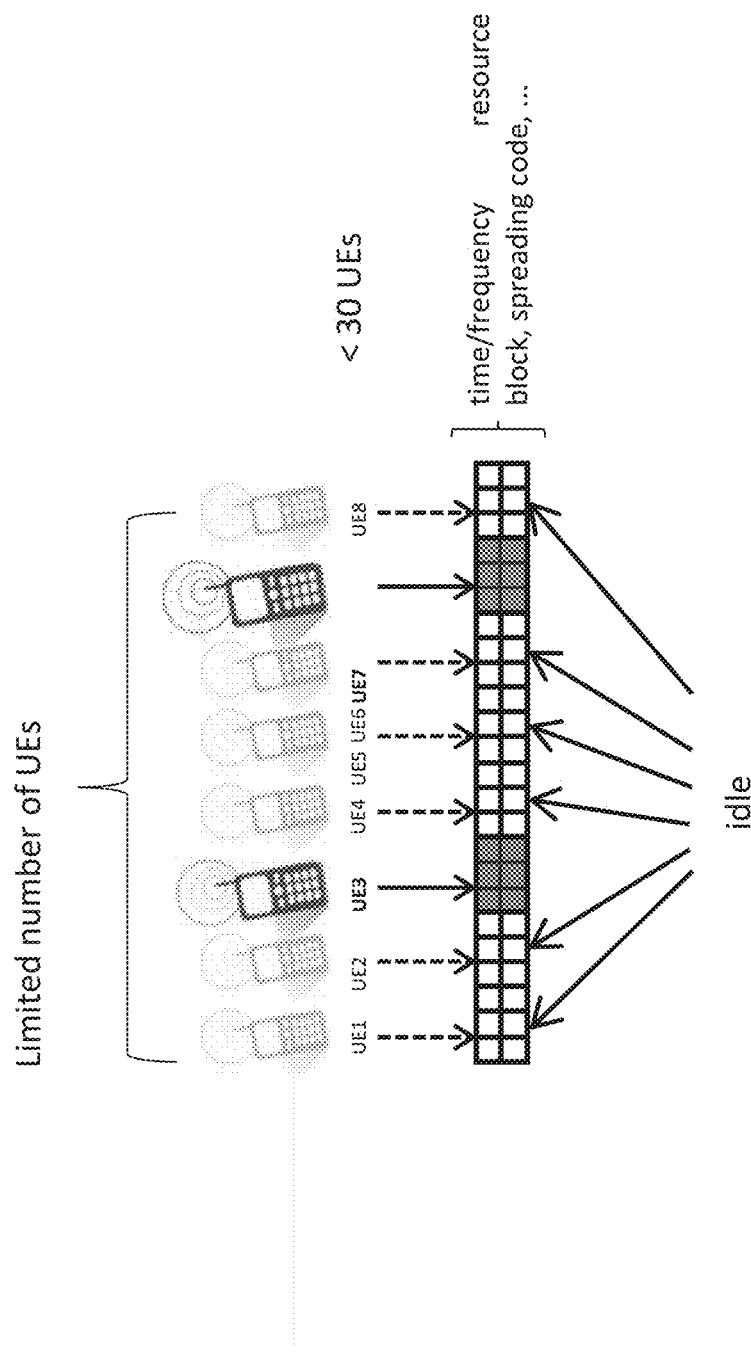
FIG. 1 shows a schematic representation of the active and idle state of different resources reserved for a limited number of user equipments (UEs) in a LTE system.

In the first scenario in which the user is permanently kept connected, dedicated resources for control signaling are assigned or reserved to each potential user, even though those users have in fact no traffic demand. Thus, the resources must be sufficient to support a reliable communication link, which may vary according to the quality of service (QoS) requirements of difference services. However, the network can support only a limited number of users due to its capacity limitation. In the case of users having a random burst traffic, the reserved resources are idle most of the time. For instance, in a 5 MHz LTE system according to 3GPP TS 36.213 version 11.0.0 Release 11, less than 30 user equipment (UE) devices can be supported at the same time, as depicted in FIG. 1 in the exemplary case of eight UEs where only two resources reserved for UE3 and UE7 are active, the remaining ones (UE1, UE2, UE4, UE5, UE6, UE8) being idle.

Figure 2:
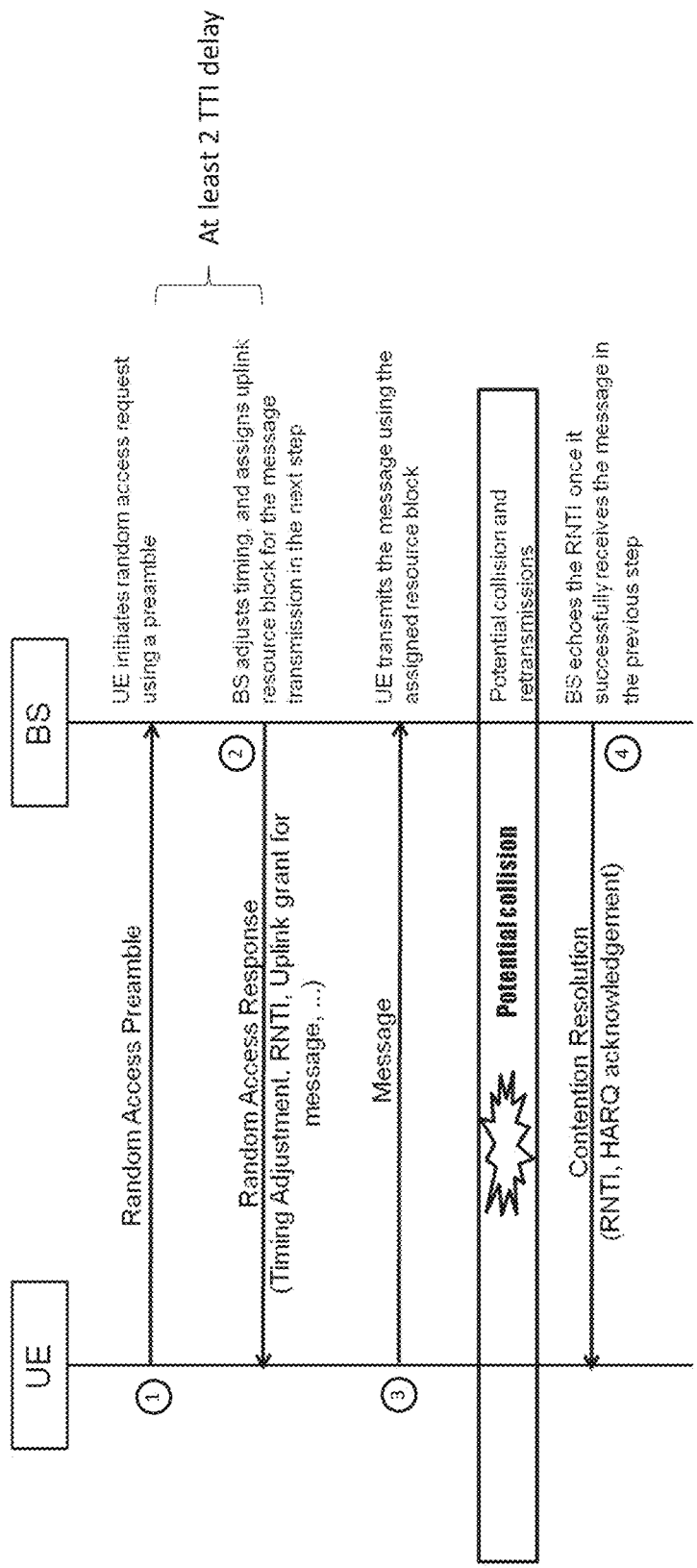
FIG. 2 shows a conventional LTE contention-based random access procedure between a user equipment (UE) device and a base station (BS) in a LTE system.

In the second scenario referring to FIG. 2 and in which a random access request/acknowledgement procedure is applied, for example using a LTE standard according to 3GPP TS 36.213 version 11.0.0 Release 11 or 3GPP TS 36.331 version 10.1.0 Release 10, the user will initialize a random access request using a preamble in a first step (step 1) and the network will assign the required resources according to the request in a second step (step 2). However, the main issue in that scenario is the large latency. Indeed, at least two steps, namely at least two transmission time intervals (TTI), are required in the random access procedure before achieving the actual transmission of the information in a third step (step 3). In addition, if many users try to access the network at the same time, there may be a high probability of collision leading thereby to a large delay due to retransmission.

Furthermore, some variations of the random access scheme, such as the carrier sense multiple access with collision avoidance (CSMA/CA) scheme and the grant-free random access scheme, exist.

In the CSMA/CA scheme, the transmitting device senses and detects the signal from other devices before the actual data transmission. However, the CSMA/CA scheme implies a certain delay due to the time period during which the devices sense whether the channel is free. That scheme suffers from scalability issues and it is not appropriate to ensure the QoS requirements of mission-critical applications in congested scenarios because the transmission of information can be delayed due to collisions between transmitting devices. In addition, the CSMA/CA scheme is based on the assumption that one transmitter can detect the signal from other transmitters at a certain distance. That can be construed as a practical limitation, in particular in the case of an area with a cell radius over several hundred meters. Thus, the transmitters have to be located close to each other in order to be able to detect other transmitters, otherwise the CSMA/CA scheme will suffer from the hidden node problem like in the WLAN.

In the grant-free random access scheme, the devices start the transmission without the coordination. Thus, the delay caused by the random access request/acknowledgement, which respectively correspond to the steps 1 and 2 of FIG. 2, is eliminated. However, there may be a risk that the same radio resource is used by more than one device so that, in the case that no collision resolution scheme is used, there may be a high occurrence of a detection error due to interference between the devices, which leads thereby to a high likelihood of a transmission failure.

Considering a common random access procedure in the LTE standard, once a terminal or user equipment (UE) device has an unscheduled transmission request, it will launch a random access (RA) procedure, which comprises in detail the four steps (numbered 1 to 4) of FIG. 2 where RNTI stands for radio network temporary identifier and HARQ stands for hybrid automatic repeat request.

In the first step (step 1), the UE device transmits a random access request using a randomly selected preamble sequence towards the base station (BS). The set of the preamble sequences is known at the UE and the BS, Therefore, the preamble can be used as the training sequence and the signature at the same time. The BS can detect different preambles and send responses towards the individual UE devices having used the corresponding preambles.

In the second step (step 2), the BS transmits a response in the downlink shared channel in response to the detected preamble sequence. For each detected preamble sequence, the BS adjusts timing by conveying information on a timing advance to be used by the UE device for its transmission and assigns uplink resources to the corresponding UE devices.

In the third step (step 3), the UE device transmits its identity and other messages towards the BS using the resources assigned by the BS in its response of the previous step.

In the fourth step (step 4), the BS echoes the UE device identity received in the third step.

However, if multiple devices select, in the first step (step 1), the same preamble at the same random access time slot, the BS may not distinguish the requests from different UE devices. Hence, a same uplink resource may be assigned to several UE devices in the second step (step 2) and if, in the third step (step 3), they use the same resource for the transmission, a collision will occur. Thus, if the data message sent in the third step (step 3) cannot be correctly decoded, the corresponding UE device will receive no confirmation in the fourth step (step 4) and those UE devices will reinitialize the preamble transmission after a certain time duration has passed. While the total collision-free procedure lasts several tens of milliseconds according to 3GPP TS 36.213 version 11.0.0 Release 11 and 3GPP TR 25.912 version 10.0.0 Release 10, the procedure completion time will be however extended in the event of a collision.

A standard solution to reduce the RA procedure completion time is to reduce the length of the transmission time interval (TTI) with the aim of shortening the duration of each step in the above RA procedure, as taught in METIS, Deliverable D2.4, "Proposed solutions for new radio access", 28 Feb. 2015. In current LTE and other universal mobile telecommunications system (UMTS) standards, TTI is the smallest unit for scheduling and time domain resource allocation. One TTI is equivalent to the duration of a data frame and constitutes a time slot for transmitting a random access message (i.e., a random access preamble or a random access response).

Figure 3:
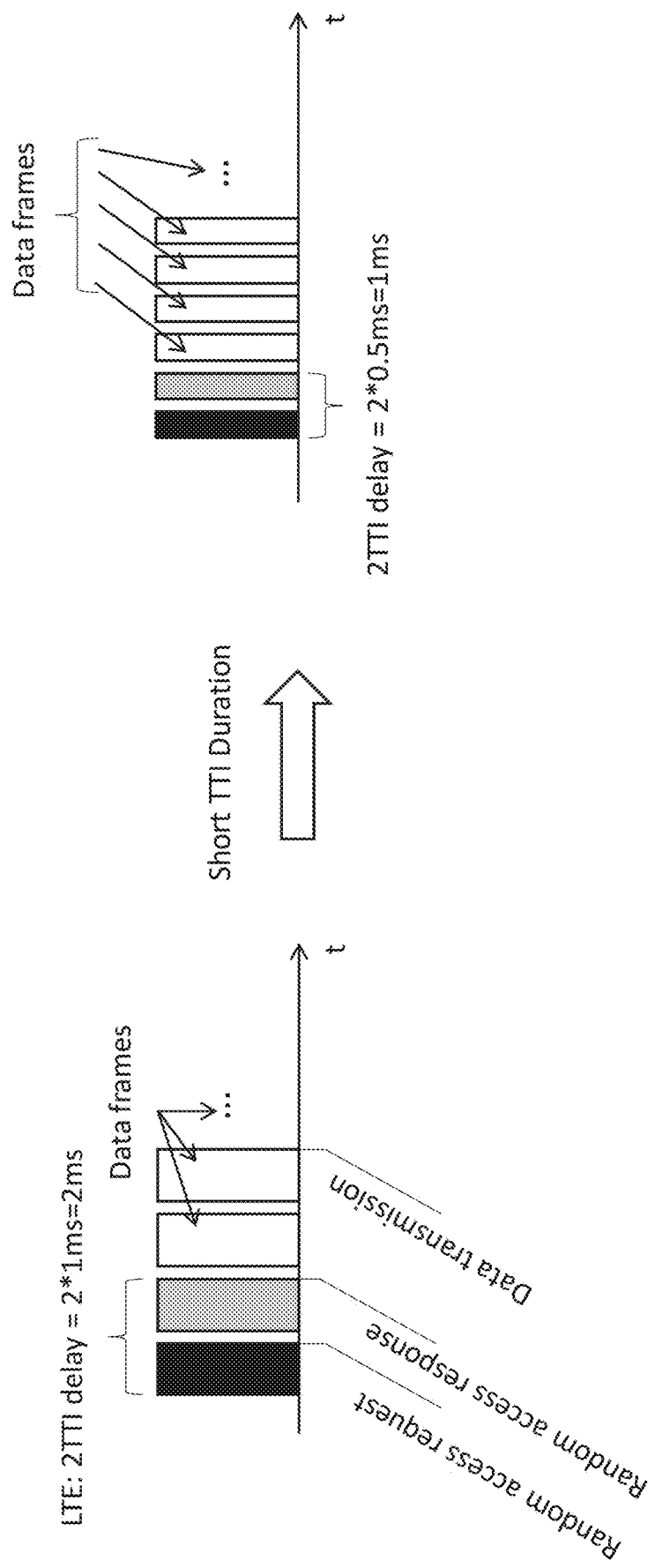
FIG. 3 shows an example of a random access delay when the TTI duration is reduced.

FIG. 3 shows an example of a random access delay when the duration of TTI is reduced. By Ignoring the additional overhead, the minimum delay caused by the random access request and the random access response takes two random access time slots and will be reduced from 2 to 1 ms when the duration of one TTI changes from 1 to 0.5 ms.

However, there are certain restrictions on reducing the TTI length. Indeed, if the system applies the same frequency resource for each data frame as the frequency resource prior to the TTI length reduction, shortening the TTI will lead to a reduced code block size that may impair the performance of the channel coding and to a higher overhead for a cyclic prefix (CP) and a guard period (GP). Should the system keep the same length of the code block as the length prior to the TTI length reduction, the sampling rate and the frequency bandwidth of each frame would be increased. Thereby, the system would require a higher frequency bandwidth and a faster signal processing capability as well, which would increase the costs for a wireless communication system.

Figure 4:
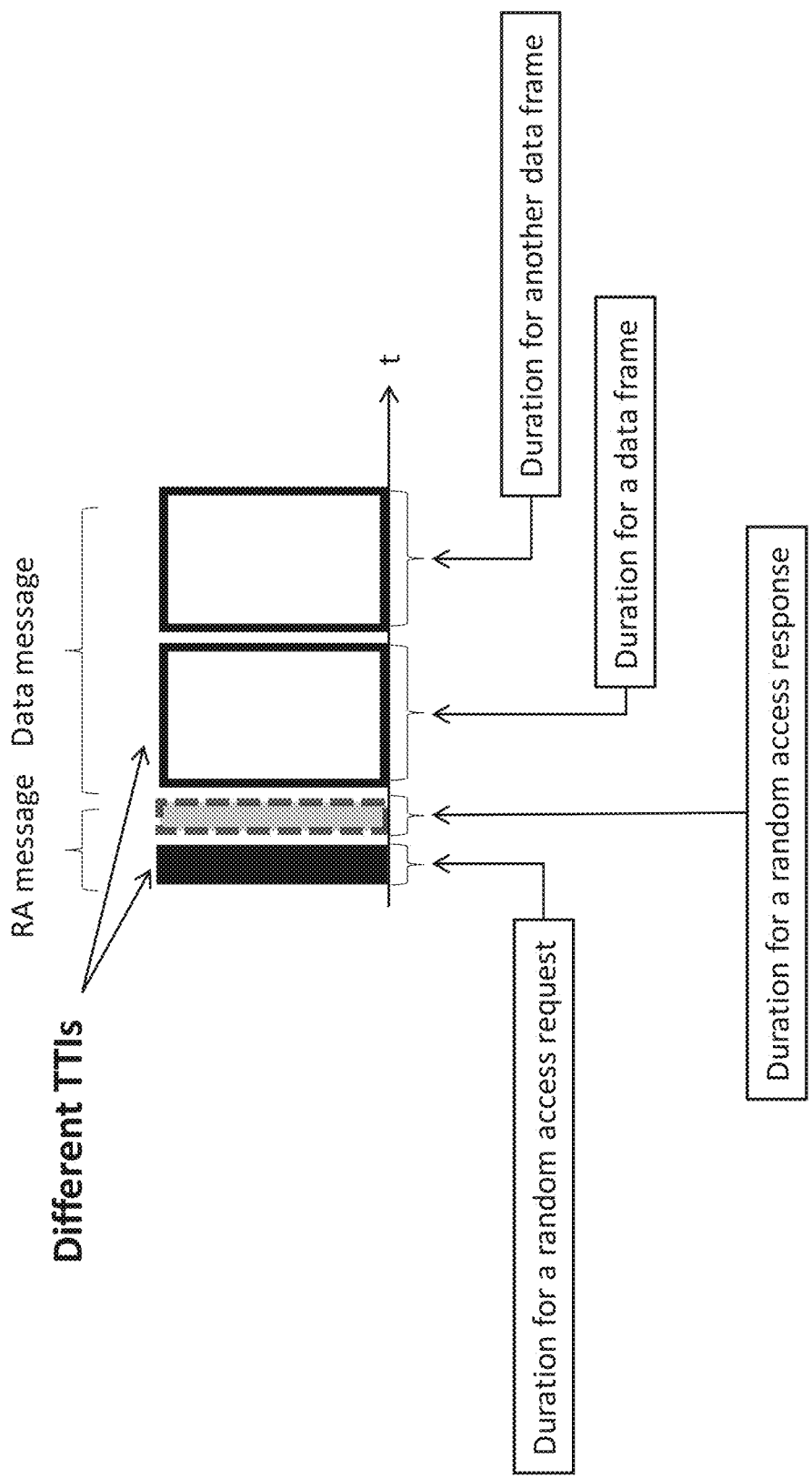
FIG. 4 shows a schematic representation of the duration of a random access message and a data message with different time units according to a first embodiment of the present invention.

FIG. 4 shows a schematic representation of the duration of a random access message and a data message with different time units according to a first embodiment of the present invention.

As can be seen therein, the transmission time interval (TTI) as a time unit of the random access request and the random access response is different from a data frame of the data message in such a manner that a non-isometric TTI can be obtained. Indeed, the duration of the random access request and/or the random access response is designed to be much shorter than the duration of transmission of each data frame of the data message. In a configuration, the duration of the random access message can be reduced and the duration can remain unchanged for the data frames. For example, the random access request or the random access response can have the duration of one symbol length equal to 71.9 microseconds, whereas the data frame can have a standard length of 1 millisecond.

During the random access request, a user equipment device can transmit a specific signature in the form of a short sequence. The signature is designed to be robust against the collisions in order to avoid any potential retransmission of the random access request as it may be the case when a collision occurs.

Thus, the random access signature can be a unique sequence, which is assigned to each user equipment (UE) device in advance. Examples of such a unique signature can be an imperfect sequence (e.g., a Gold sequence) that can provide M different sequences with less than M bits, the number of available sequences M being always larger than the number of UE devices to be supported.

Figure 5:
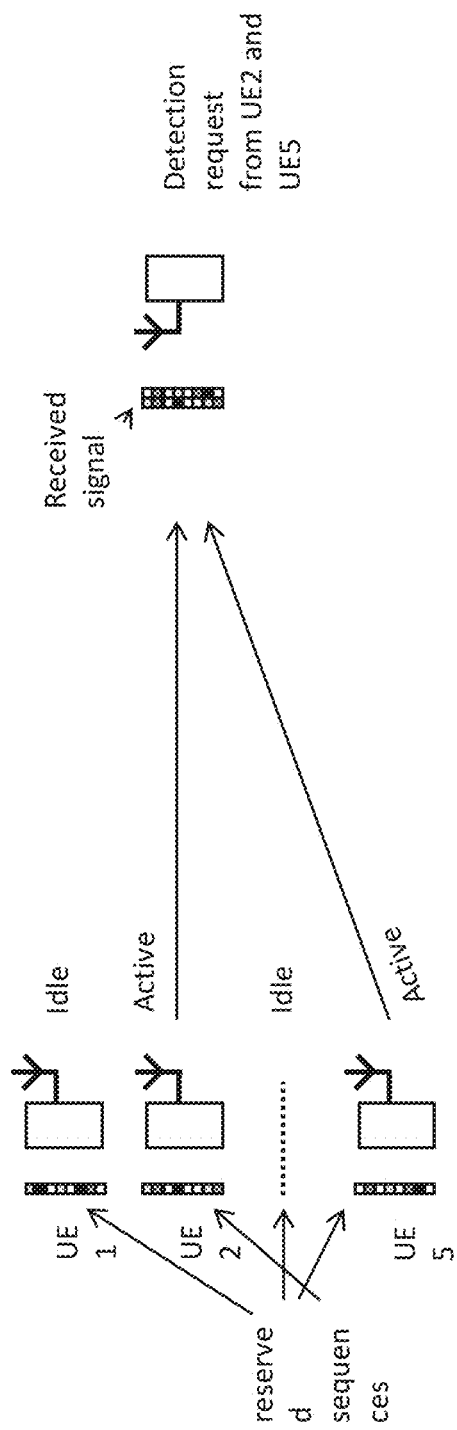
FIG. 5 shows a schematic representation of a unique signature from its assignment until its reception and detection according to a second embodiment of the present invention.

FIG. 5 shows a schematic representation of such a unique signature from its assignment to UE devices until its reception and detection by a receiving device according to a second embodiment of the present invention.

As can be seen therein, different sequences are respectively reserved for each user equipment (UE) device (denoted UE1, UE2, . . . , UE5), each sequence corresponding to a respective unique signature. As depicted in FIG. 5, the two active UE devices (UE2, UE5) transmit their respective random access request and their signatures are then received by the receiving device, such as a base station (BS) or other UE devices in case of direct-to-direct (D2D) communication. The random access requests from each of those two UE devices (UE2, UE5) are afterwards detected by applying, for example, correlation filters on the received signals.

Figure 6:
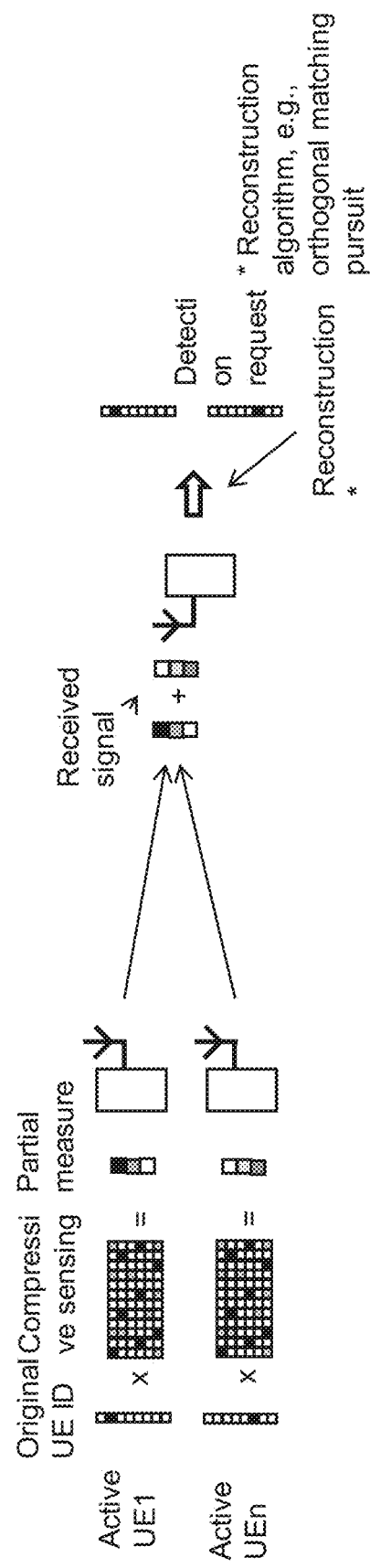
FIG. 6 shows a schematic representation of a compressed signature from its compression until its reception and detection according to a third embodiment of the present invention.

Referring to FIG. 6 showing a schematic representation of a compressed signature from its compression until its reception and detection according to a third embodiment of the present invention, the random access signature can alternatively be a compressed signature, which is assigned to each active UE device, in the case that the random access requests are triggered by abnormal events having a sparse nature.

As depicted therein, the active UE devices (UE1, UEn) transmit each a compressed signature, which is much shorter than the aforementioned unique signature. The total number of active and inactive devices being N, the compressed signature is generated by multiplying an original identity (ID) of each UE device and a compressive sensing matrix (A) having M rows and N columns. The original device ID is a unique ID, which can be modelled by a length-N binary sequence with sparsity level 1 (i.e., with only 1 non-zero entry). By multiplying with the compressive sensing matrix A, each original device ID can be compressed into a signature of length M with M<<N, which corresponds to a certain column in the sensing matrix A. The transmitted compressed signatures are superimposed in the wireless channel and the receiving device collects a linear combination of those transmitted compressed signatures. Then, the original device ID of each active UE device is reconstructed using either some convex optimization algorithms such as basis pursuit or some greedy algorithms such as orthogonal matching pursuit (OMP) and iterative hard thresholding (IHT). For informative purpose, the OMP and IHT algorithms are respectively summarized in the following Tables I and II:

Table I

TABLE I

Orthogonal matching pursuit (OMP)

Input: measurement matrix A, measurement vector y.
Initialization: $S^0 = \emptyset$, $x^0 = 0$.
Iteration: repeat until a stopping criterion is met at $n = \bar{n}$:

TABLE I-continued

Orthogonal matching pursuit (OMP)

$$S^{n+1} = S^n \cup \{j_{n+1}\}, j_{n+1} := \operatorname*{argmax}_{j \in [N]} \{|(A^*(y - Ax^n))_j|\}, \quad (OMP_1)$$

$$x^{n+1} = \operatorname*{argmin}_{z \in \mathbb{C}^N} \{\|y - Az\|_2, \operatorname{supp}(z) \subset S^{n+1}\}. \quad (OMP_2)$$

Output: the $\bar{n}$-sparse vector $x^t = x^{\bar{n}}$.

TABLE II

Iterative hard thresholding (IHT)

Input: measurement matrix A, measurement vector y, sparsity level s.
Initialization: s-sparse vector $x^0$, typically $x^0 = 0$.
Iteration: repeat until a stopping criterion is met at $n = \bar{n}$:
$$x^{n+1} = H_s(x^n + A^*(y - Ax^n)). \quad (IHT)$$
Output: the s-sparse vector $x^\# = x^{\bar{n}}$.

In comparison to the unique signature scheme, the compressed signature scheme requires less bandwidth to be reserved for the transmission of the random access requests because the transmitted signature in the compressed sensing scheme is much shorter.

Once the random access request is detected by the base station (BS), the base station (BS) responds by transmitting a random access acknowledgement and assigns the resource for the data message transmission according to the step 2 of FIG. 2.

In the case of a direct D2D communication, in which the random access request is broadcast among the UE devices and received directly by the UE devices, the step 2 consisting in transmitting a random access acknowledgement and assigning a resource can be skipped. The time delay caused by the random access channel time slot can thereby be reduced. To achieve that, a resource pool shall be pre-assigned to the group of the UE devices.

Thus, a rank or order number is defined and attributed in advance to each UE device, such that each UE device amongst the group knows its own rank or order number in advance. The rank defines the order of priority in which the UE device will take or acquire the resource from the resource pool when multiple UE devices want to transmit data messages at the same time over the D2D communication. Thereby, a collision during the data transmission can be avoided since it is then not possible to assign an identical resource to a plurality of UE devices.

The reduction in both the time delay and the probability of collision provides the benefit of reducing the latency in the random access procedure.

Figure 7:
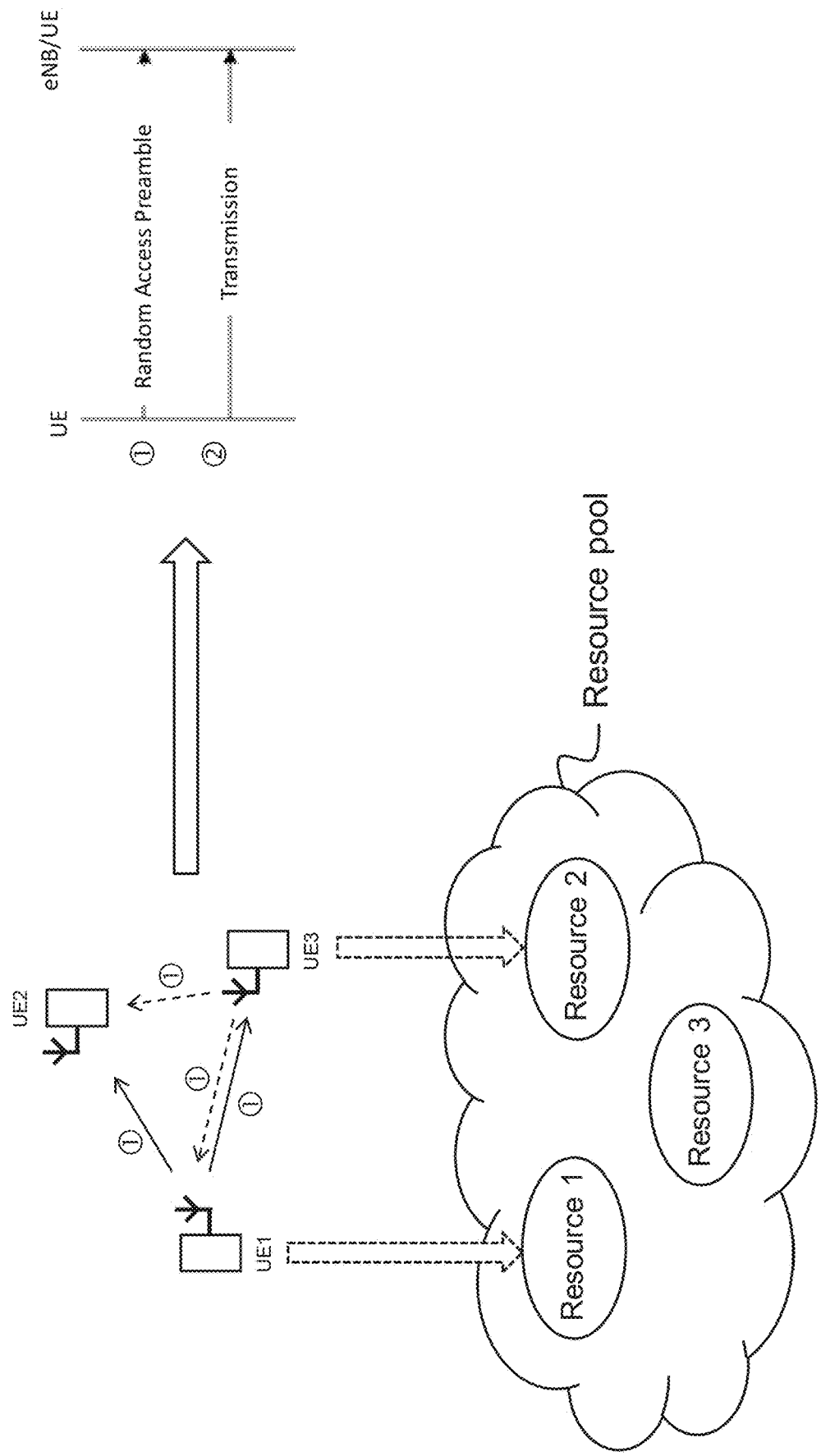
FIG. 7 shows an example of a direct device-to-device communication in a random access scheme according to a fourth embodiment of the present invention.

FIG. 7 shows an example of a direct device-to-device communication in a random access scheme according to a fourth embodiment of the present invention.

As depicted in FIG. 7, two active UE devices (UE1, UE3) transmit a random access request (step numbered 1) at the same time slot and the respective random access requests are broadcast or multi-cast amongst the group of the UE devices and detected by each UE device within the group. If UE1 is assumed to have a higher rank than UE3 to take or acquire the resource from the resource pool, then UE1 will take the first available resource from the resource pool for its data transmission (step numbered 2), and UE3 will then take the second one for its data transmission (step numbered 2).

Once the UE device receives the resource assignment information from the BS or identifies and acquires the resource needed for the transmission of its data message in the case of a direct D2D communication, the data transmission will start immediately.

Figure 8:
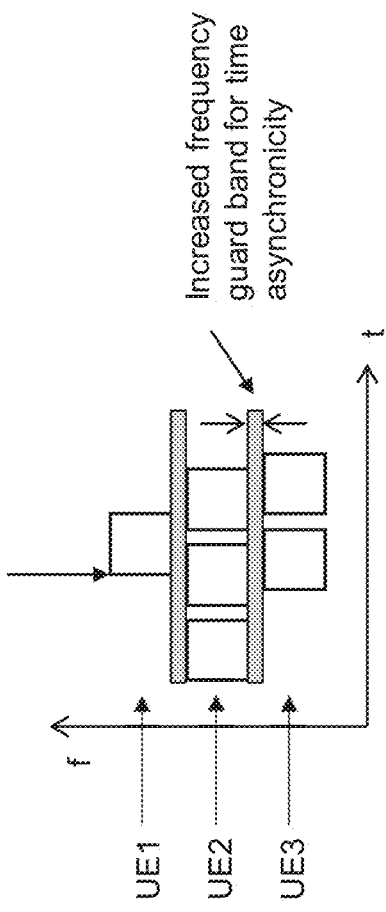
FIG. 8 shows a comparative TTI grid in a standard lattice structure and an innovative irregular structure applied to the data frames according to a fifth embodiment of the present invention.
Figure 8:
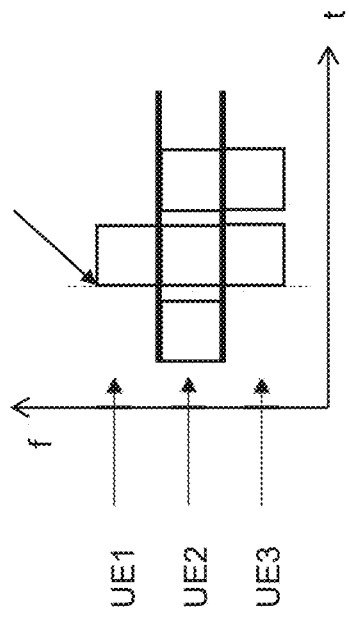

FIG. 8 shows a comparative TTI grid in a standard lattice structure and an innovative irregular structure applied to the data frames according to a fifth embodiment of the present invention, wherein different frequency (f) resources are assigned to three UE devices (UE1, UE2, UE3) for allowing their data transmission over time (t).

The conventional LTE system relies on a fully synchronous data transmission, wherein the UE devices are adapted to transmit the data frames of their data signals or data messages aligned with a standard TTI grid, as depicted in the lattice structure of FIG. 8. Owing to such an alignment, the interference between the data signals transmitted by the different UE devices can be kept to a minimum level. Nevertheless, the major drawback of said conventional LTE system intervenes in a delay-critical random access scenario since the data transmission shall be suspended until the next TTI starts.

Figure 9:
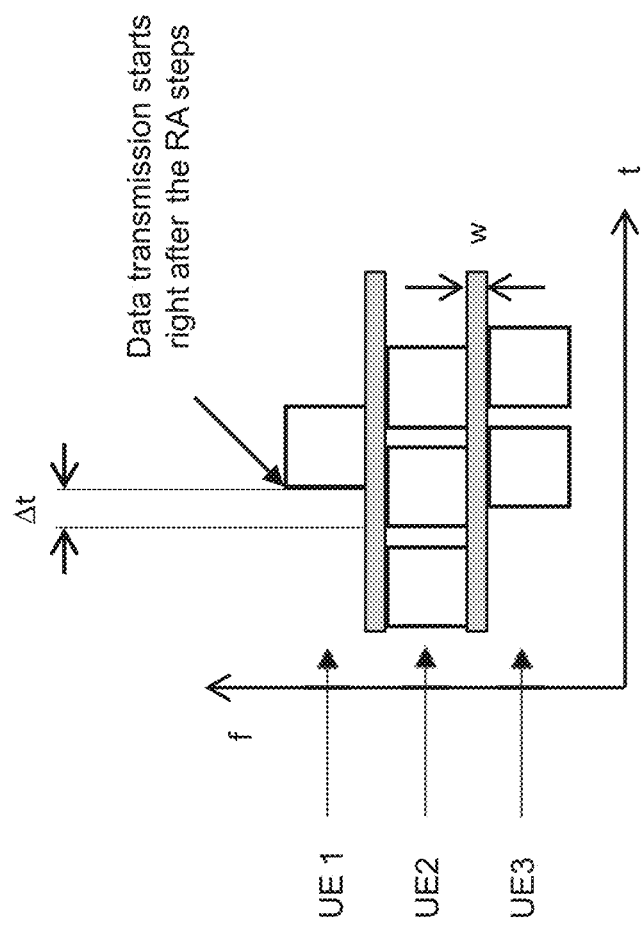
FIG. 9 shows a TTI grid in the innovative irregular data frame structure, wherein the width of the frequency guard band can be optimized according to the time misalignment, according to a sixth embodiment of the present invention.

In order to circumvent the issue, the data transmission in the present invention shall be able to start immediately after the previous steps of random access (RA) request and response, as depicted in the irregular structure of FIG. 8. However, there is no guarantee that the transmitted data signals from different UE devices are fully aligned in time (t) so that mutual interference may be created between the data signals of the UE devices in case of time misalignment ($\Delta t$). In order to mitigate such mutual interference, the irregular data frame structure provides a frequency guard band, which is inserted between a pair of frequency resources assigned to different UE devices, as depicted in FIG. 9 showing a TTI grid in the innovative irregular data frame structure according to a sixth embodiment of the present invention. Since the time misalignment ($\Delta t$) between the different UE devices is known in advance, namely before the resource allocation, the size (w), i.e., the width (w), of the frequency guard band can be optimized on-the-fly according to the level of time misalignment ($\Delta t$) and the impact of said time misalignment ($\Delta t$) on the distortion.

If the data message is modulated according to a cyclic prefix (CP)-based orthogonal frequency-division multiplexing (OFDM) scheme, the required size of the frequency guard band may become large if the time misalignment ($\Delta t$) between a data frame of an UE device and an adjacent data frame from another UE device, the two data frames being located in adjacent frequency sub-bands, exceeds the size of the CP. Thereby, a high signal power leakage may occur in the frequency domain due to the large side lobes of the corresponding sinc function, also known as the cardinal sine function.

In order to accommodate such a time misalignment ($\Delta t$) exceeding the CP length, it is advantageous to use multi-carrier modulation schemes with filtering/pulse shaping, such as filter bank multi-carrier (FBMC) (as, for example, specified in: B. Farhang-Boroujeny, "OFDM Versus Filter Bank Multicarrier", IEEE Signal Processing Magazine, vol. 28, no. 3, pp. 92-112, May 2011), pulse shaped orthogonal frequency-division multiplexing (P-OFDM) (as, for example, specified in: Z. Zhao, M. Schellmann, Q. Wang, X. Gong et al., "Pulse shaped OFDM for asynchronous uplink access", Asilomar Conference on Signals, Systems and Computers, Monterey, USA, November 2015), and universal filtered OFDM (UF-OFDM) (as, for example, specified in: T. Wild, F. Schaich and Y. Chen, "5G Air Interface Design based on Universal Filtered (UF-)OFDM", International Conference on Digital Signal Processing (DSP), Hong Kong, August 2014), which enable the signal power distribution to be strictly confined in the frequency domain. Thereby, the frequency guard bands, which are required between the frequency resources allocated to the different UE devices, can be minimized while enabling a proper isolation of the data signals of the different UE devices.

Figure 10:
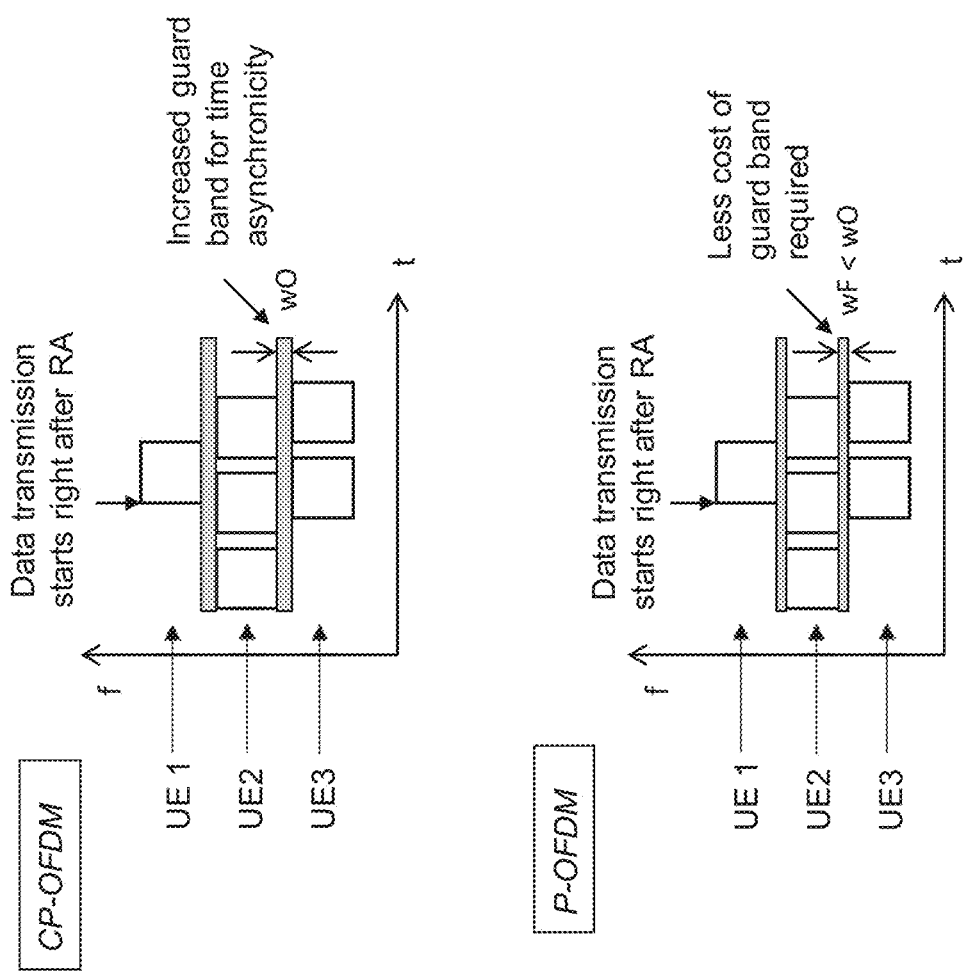
FIG. 10 shows the different sizes of the frequency guard band in the irregular data frame structure using cyclic prefix (CP)-based orthogonal frequency-division multiplexing (OFDM) (CP-OFDM) and pulse shaped orthogonal frequency-division multiplexing (P-OFDM) according to a seventh embodiment of the present invention.

To that extent, FIG. 10 illustrates the different sizes of the frequency guard band in the innovative irregular data frame structure using two multi-carrier modulation schemes: CP-OFDM and P-OFDM, according to a seventh embodiment of the present invention. As can be seen therein, the size (wF) of the frequency guard band for P-OFDM can be reduced with respect to the size (wO) of the frequency guard band for CP-OFDM.

The size (w) of the frequency guard band that is required for the separation of the data signals depends on the power decay of the pulse shape/filter used by the UE device for the transmission of its data signal and the desired power suppression level in the adjacent frequency band used for transmitting the data signal of another UE device.

Figure 11:
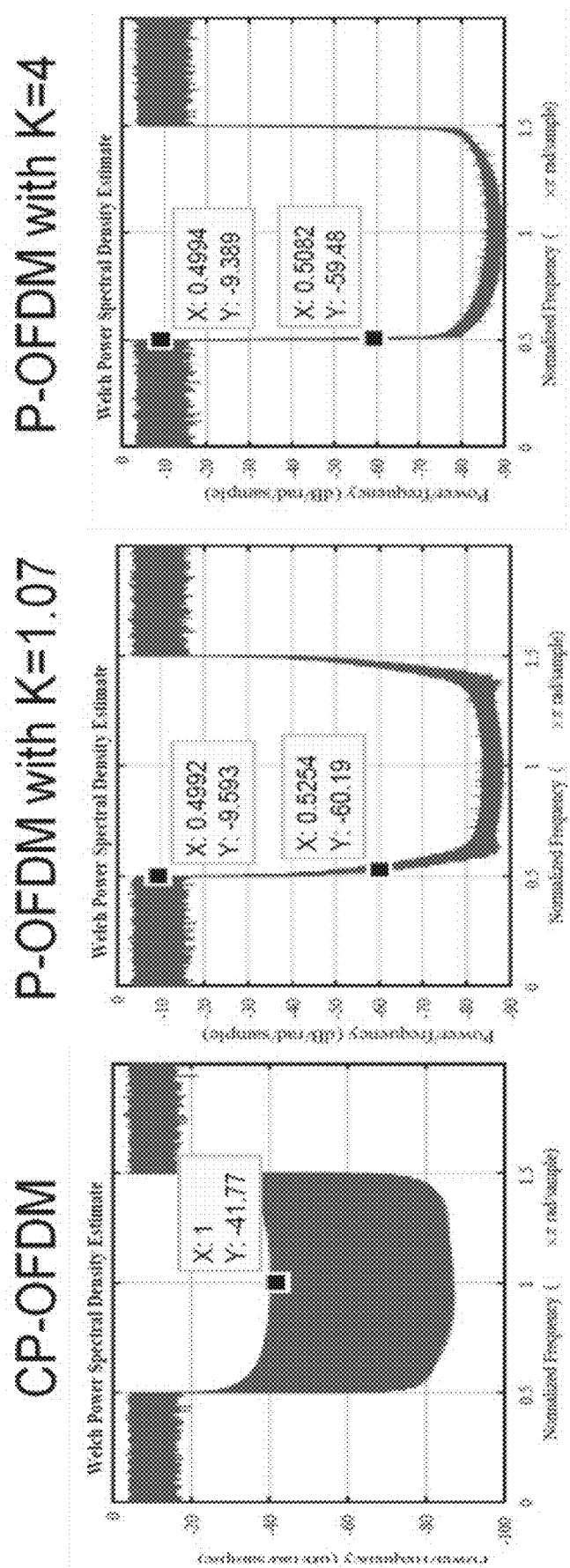
FIG. 11 shows the power spectral densities of pulse shapes used in: (a) CP-OFDM, (b) P-OFDM (K=1.07) and (c) P-OFDM (K=4), according to an eighth embodiment of the present invention.

FIG. 11 shows the power spectral densities of pulse shapes used in: (a) CP-OFDM, (b) P-OFDM (K=1.07) and (c) P-OFDM (K=4), according to an eighth embodiment of the present invention.

Specifically, FIG. 11 illustrates the power decay at the band edge of a notched multi-carrier signal, namely a multi-carrier signal whose set of consecutive sub-carriers has been set to zero, based on three different pulse shapes: (a) a rectangular pulse used in CP-OFDM, (b) a pulse used in P-OFDM with an improved power localization in frequency and a slightly extended time duration amounting to 1.07 T, where T is the symbol interval of the data transmission (thereby allowing a translation to a windowed OFDM system), and (c) a pulse used in P-OFDM with a long time duration amounting to 4 T and a well-localized signal power in the frequency domain.

As can be seen therein, the steepness of the power decay at the band edges of the spectrum notch is drastically increased for P-OFDM compared to CP-OFDM. Correspondingly, the frequency guard band that needs to be chosen to attain the same desired power suppression level will be of larger size for CP-OFDM. For example, let us assume a desired power suppression level of 40 dB, which is a typical value. For CP-OFDM as found in FIG. 11(a), this value is attained close to the center of the notch (as indicated by the black square symbol) so that the band stretching from the band edge up to this central point should be chosen for the frequency guard band. For P-OFDM as found in FIGS. 11(b) and (c), the level of 40 dB is attained close to the band edge (as indicated by the black square symbol) so that the size of the frequency guard band for P-OFDM would be much smaller than the size of the frequency guard band for CP-OFDM. Although the difference between the two pulses used in the respective P-OFDM is not visually that prominent, the size of the frequency guard band for P-OFDM (K=4) as found in FIG. 11(c) is significantly reduced to 60% with respect to the size of the frequency guard band for P-OFDM (K=1.07) as found in FIG. 11(b).

If the size of the time misalignment ($\Delta t$) between a first data frame located in a first frequency sub-band and a second data frame located in a second frequency sub-band adjacent to the first frequency sub-band is larger than the size of the cyclic prefix (CP), then the system can be considered asynchronous and a frequency guard band is required to minimize the resulting interference between the transmitted data signals.

Figure 12:
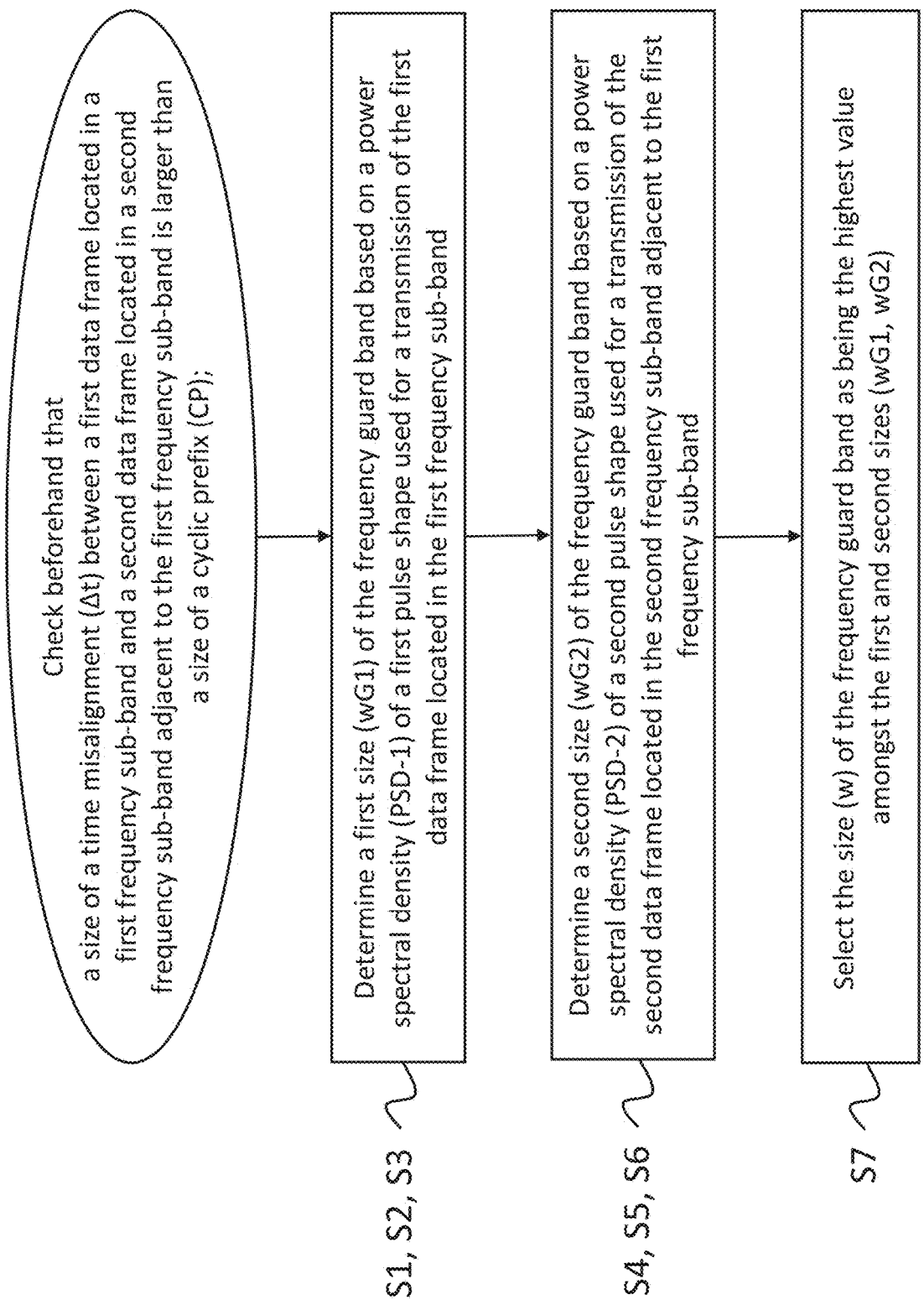
FIG. 12 shows a flow chart describing the steps for determining an optimal size of a frequency guard band in a random access scheme according to a ninth embodiment of the present invention.

FIG. 12 shows a flow chart describing the steps for determining an optimal size of a frequency guard band in a random access scheme according to a ninth embodiment of the present invention.

Referring to FIG. 12, the size (w) of such a frequency guard band can be optimally determined by applying in more details the following steps.

In a first step (S1), the power spectral density (PSD-1) for the sub-carriers of the transmitting UE device (denoted hereafter as first UE device) is calculated based on the pulse shape used by that first UE device for its transmission of data frames.

In a second step (S2), the desired power suppression level (Pi1), which characterizes the maximum interference imposed on the adjacent frequency sub-band occupied by another transmitting UE device (denoted hereafter as second UE device), is defined.

In a third step (S3), the size (wG1) of the frequency guard band required to attain Pi1 is determined from PSD-1.

In a fourth step (S4), the power spectral density (PSD-2) for the sub-carriers of the second UE device is calculated based on the pulse shape used by that second UE device for its transmission of data frames.

In a fifth step (S5), the desired power suppression level (Pi2), which characterizes the maximum interference imposed on the frequency sub-band occupied by the first UE device, is defined.

In a sixth step (S6), the size (wG2) of the frequency guard band required to attain Pi2 is determined from PSD-2.

In a seventh and last step (S7), the size (w) of the necessary frequency guard band is selected as being the highest value amongst wG1 and wG2.

In a first scenario, the base station can be adapted to determine the size (w) of the frequency guard band and transmit said size (w) together with an information about the assignment of the resource blocks towards the transmitting UE device by means of its random access response. The UE device will then transmit its data frames located in the frequency sub-band assigned by the resource block along with the guard band separating its frequency sub-band from to the adjacent frequency sub-band.

In a second scenario, the base station can be adapted to transmit the information about the time misalignment ($\Delta t$), the desired power suppression level ($P_{i2}$) and the pulse shape on the adjacent frequency sub-band, together with an information about the assignment of the resource blocks, towards the transmitting UE device. Thereby, the transmitting UE device can locally determine the size of the guard band. As a variation of that scenario, the desired power suppression levels ($P_{i1}$, $P_{i2}$) and the pulse shape can also be pre-specified in the network so that the information about them does not need to be every time transmitted towards the transmitting UE device.

In a third scenario referring to a direct D2D communication in which the step of random access acknowledgement and resource assignment is skipped, the information about the desired power suppression levels ($P_{i1}$, $P_{i2}$) and the pulse shape on the adjacent frequency sub-band should be pre-defined and known by each UE device in advance. The time misalignment ($\Delta t$) can be determined based on the detection of data signals transmitted from another UE device on the adjacent frequency sub-band.

In summary, the present embodiments relate to a reliable random access scheme exhibiting a non-isometric frame duration and a low latency. The random access message and the data message have a duration with a different time unit and the time slot of the random access message is much shorter than the duration of a data frame. A specific signature, which is designed to be robust against the collisions, is transmitted during the random access request of the random access message, the signature being either a unique sequence or a compressed signature. The user equipment device transmits the data message immediately after receiving its resource through a frame structure showing a time misalignment between adjacent data frames located in different or identical frequency sub-bands. A frequency guard band is inserted between its resource and an adjacent resource assigned to another user equipment device, the frequency guard band having an adaptive size according to the level of time misalignment and its impact on the distortion.

While the embodiments have been illustrated and described in detail in the drawings and the foregoing description, such illustration and description are to be considered illustrative or exemplary and not restrictive. The embodiments are not limited to the disclosed embodiments. From reading the present disclosure, other modifications will be apparent to a person skilled in the art. Such modifications may involve other features that are already known in the art and that may be used instead of or in addition to features already described herein.

The embodiments have been described in conjunction with various exemplary embodiments herein. However, other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

Although the present embodiments hav been described with reference to specific features and embodiments thereof, it is evident that various modifications and combinations can be made thereto without departing from the spirit and scope of the invention. The specification and drawings are, accordingly, to be regarded simply as an illustration of the embodiments as defined by the appended claims, and are contemplated to cover any and all modifications, variations, combinations or equivalents that fall within the scope of the present embodiments.

What is claimed is:

1. A user equipment (UE) device for transmitting a data message using a random access procedure in a wireless communication system, wherein the UE device is adapted to:

transmit a random access request and the data message, the random access request and the data message having a respective duration with a different time unit and the time unit of the random access request being shorter than the time unit of the data message; and transmit a compressed signature through the transmission of the random access request, the compressed signature being formed by multiplying a compressive sensing matrix (A) and a binary sequence corresponding to a unique identity (ID) of the UE device, the compressed signature being of a smaller length than a length of the binary sequence.

2. The UE device of claim 1, wherein the UE device is adapted to:
receive a random access response from a base station (BS) in response to the random access request being transmitted to the BS, the time unit of the random access response being different from the time unit of the data message.

3. The UE device of claim 1, wherein the UE device is adapted to:
transmit a unique signature, in the form of a short sequence, through the transmission of the random access request.

4. The UE device of claim 1, wherein the random access request is transmitted towards another UE device over a device-to-device (D2D) communication, wherein the UE device has a predetermined order number, which is known in advance by each UE device and respectively attributed to each UE device, and the UE device is adapted to:
acquire, from a predetermined resource pool assigned to a group of UE devices in the D2D communication, a resource for its transmission to the other UE devices, the acquisition of the resource being carried out in order of priority according to the predetermined order number if a plurality of UE devices desire to transmit data messages to other UE devices at a same time over the D2D communication.

5. The UE device of claim 2, wherein the UE device is adapted to:
transmit the data message through a data frame structure upon assignment of a resource, wherein a time misalignment ($\Delta t$) occurs between two data frames located in adjacent frequency sub-bands, the two data frames being separately and respectively transmitted from the UE device and another UE device.

6. A user equipment (UE) device for transmitting a data message using a random access procedure in a wireless communication system, wherein the UE device is adapted to:
transmit a random access request and the data message, the random access request and the data message having a respective duration with a different time unit and the time unit of the random access request being shorter than the time unit of the data message; and
transmit the data message through a data frame structure upon assignment of a resource, wherein a time misalignment ($\Delta t$) occurs between two data frames located in adjacent frequency sub-bands, the two data frames being separately and respectively transmitted from the UE device and another UE device, wherein an adaptive frequency guard band is inserted between the resource and an adjacent resource assigned to the other UE device, the frequency guard band
having an adaptive size (w) based on a level of the time misalignment ($\Delta t$) between two data frames located in adjacent frequency sub-bands, on a decay power of a pulse shape used for the data transmission and on a desired power suppression level (Pi1, Pi2) to be attained by the respective pulse shape used for the transmission of each one of the two data frames.

7. The UE device of claim 6, wherein the UE device is adapted to:
determine the adaptive size (w) of the frequency guard band based on information received from the BS about the time misalignment ($\Delta t$), the desired power suppression levels (Pi1, Pi2) to be attained by the respective pulse shapes used for the transmission of the two data frames located in adjacent frequency sub-bands and the pulse shape used for the transmission of the data frame located in the adjacent frequency sub-band.

8. The UE device of claim 6, wherein when in a D2D communication with another UE device, the UE device is adapted to:
determine the adaptive size (w) of the frequency guard band by determining the time misalignment ($\Delta t$) based on a detection of the received data frame transmitted from the other UE device and located in the adjacent frequency sub-band, and by respecting the desired power suppression levels (Pi1, Pi2) to be attained by the respective pulse shapes and the pulse shape used for the transmission of the data frame located in the adjacent frequency sub-band.

9. A base station (BS), the BS being adapted to:
exchange information with at least one user equipment (UE) device for transmitting a data message using a random access procedure in a wireless communication system, wherein the UE device is adapted to transmit a random access request and the data message, the random access request and the data message having a respective duration with a different time unit and the time unit of the random access request being shorter than the time unit of the data message;
receive the data message from the at least one UE device;
determine a size (w) of a frequency guard band based on a time misalignment ($\Delta t$), a desired power suppression levels (Pi1, Pi2) to be attained by respective pulse shapes used for transmission of the two data frames located in adjacent frequency sub-bands and the respective pulse shapes used for the transmission of the respective two data frames; and
inform the UE device about the determined size (w) of the frequency guard band.

10. A method for transmitting a data message using a random access procedure in a wireless communication system, the method comprising:
transmitting a random access message;
transmitting the data message,
wherein:
the random access message and the data message have a respective duration with a different time unit; and
the time unit of the random access message is shorter than the time unit of the data message; and
transmitting a compressed signature through the transmission of the random access request, the compressed signature being formed by multiplying a compressive sensing matrix (A) and a binary sequence corresponding to a unique identity (ID) of the UE device, the compressed signature being of a smaller length than a length of the binary sequence.

11. A method of determining a size (w) of a frequency guard band in a wireless transmission system, the method comprising:
checking whether a size of a time misalignment ($\Delta t$) between a first data frame located in a first frequency sub-band and a second data frame located in a second frequency sub-band adjacent to the first frequency sub-band is larger than a size of a cyclic prefix (CP); and
applying, when the size of the time misalignment ($\Delta t$) is larger than the size of the cyclic prefix (CP), the following steps:

determining a first size (wG1) of the frequency guard band based on a power spectral density (PSD-1) of a first pulse shape used for a transmission of the first data frame located in the first frequency sub-band;

determining a second size (wG2) of the frequency guard band based on a power spectral density (PSD-2) of a second pulse shape used for a transmission of the second data frame located in the second frequency sub-band adjacent to the first frequency sub-band; and selecting as the size (w) of the frequency guard band the highest value amongst the first and second sizes (wG1, wG2).

* * * * *